United States Patent [19]

Arakawa et al.

[11] Patent Number: 4,574,283

[45] Date of Patent: Mar. 4, 1986

[54] DATA TRANSMISSION SYSTEM FOR USE IN AN AIR CONDITIONING CONTROL APPARATUS

[75] Inventors: Mutsumi Arakawa, Machida; Junichi Ueno, Ayase; Yozo Kawaguchi, Sendai; Norio Shimura, Kamakura; Shoichi Matsunaga, Hatano; Kiyoshi Fukaya, Hiratsuka, all of Japan

[73] Assignee: Yamatake Honeywell, Japan

[21] Appl. No.: 451,648

[22] Filed: Dec. 20, 1982

[30] Foreign Application Priority Data

Dec. 22, 1981 [JP] Japan .................................. 56-207442

[51] Int. Cl.[4] .......................... H04Q 9/00; F24F 3/00
[52] U.S. Cl. .................................. 340/825.08; 165/22; 236/1 B
[58] Field of Search ...................... 340/825.02, 825.04, 340/825.22, 825.08, 825.06, 870.13, 870.17, 825.52, 825.54, 825.51; 370/55, 96, 86; 364/140, 141; 165/22; 236/1 B, 91 F

[56] References Cited

U.S. PATENT DOCUMENTS

| | | | |
|---|---|---|---|
| 4,047,159 | 9/1977 | Boudry | 340/825.08 |
| 4,090,248 | 5/1978 | Swanson et al. | 340/825.06 |
| 4,199,662 | 4/1980 | Lowe, Jr. | 370/85 |
| 4,227,178 | 10/1980 | Gergaud et al. | 340/825.52 |
| 4,284,126 | 8/1981 | Dawson | 340/825.22 |
| 4,438,434 | 3/1984 | Wason | 340/825.51 |
| 4,468,655 | 8/1984 | Iwata | 340/870.13 |

Primary Examiner—Donald J. Yusko
Attorney, Agent, or Firm—Trevor B. Joike

[57] ABSTRACT

In a data transmission system having a main controller for transmitting polling messages in a polling sequence and a plurality of terminal controllers responsive to a polling message to transmit data to the main controller, the finally polled terminal controller transmitting an END code for informing the main controller of the end of data transmission.

14 Claims, 8 Drawing Figures

DATA TRANSMISSION SYSTEM FOR USE IN AN AIR CONDITIONING CONTROL APPARATUS

BACKGROUND OF THE INVENTION

The present invention relates to a data transmission system for use in data transmission and reception in an air conditioning control apparatus and the like.

The data transmission system of the type described generally has a central control unit having a decision and processing function and local devices installed in scattered locations for data transmission and reception between the central control unit and local devices. The central control unit has a data file set up for the local devices so as to call the local devices successively based on the content of the data file for data transmission and reception. Data items collected from the local devices are stored respectively at addresses in the data file which correspond to the local devices. Where there is a need to add or remove a local device or devices, the content of the data file is required to be altered each time such addition or removal is carried out. Therefore, the system is disadvantageous in that its overall arrangement cannot be changed with ease.

SUMMARY OF THE INVENTION

An object of the present invention is to eliminate the foregoing prior difficulty completely. According to the present invention, there is provided a highly effective data transmission system having a main controller and a plurality of terminal controllers responsive to polling signals from the main controller for successively transmitting data to and receiving data from the main controller wherein a finally polled one of the terminal controllers transmits an end code indicative of the final polling, and the main controller, in response to the end code, detects the completion of transmission of data to and reception of data from all of the terminal controllers. Mere addition or removal of a terminal controller allows a required data file to be set up automatically without troubling the operator over the preparation of a data file.

BRIEF DESCRIPTION OF THE DRAWINGS

The present invention will now be described in detail with reference to the drawings in which.

DETAILED DESCRIPTION

For ease of description, the following nomenclature denotes the associated devices: MCT ... main controller, $SCT_1$-$SCT_m$ ... subcontrollers, $TCT_{11}$-$TCT_{mn}$ ... terminal controllers, TE ... terminal equipment, T ... temperature sensor, H ... humidity sensor, MV ... motor control valve, FM ... fan motor, MS ... electromagnetic switch, CPUm, CPUs, CPUt ... processors, ROMm, ROMs, ROMt ... read only memories, RAMm, RAMs, RAMt ... random access memories, TRXm, $TRXs_1$, $TRXs_2$, TRXt ... transmission circuits, IFm, $IFt_1$, $IFt_2$ ... interfaces, WRT ... write circuits, PROM ... programmable read only memories, BUSm, BUSs, BUSt ... buses, CDG ... code generators, $CD_{NO}$ ... number code, $CD_{END}$ ... end code.

Figure 1:
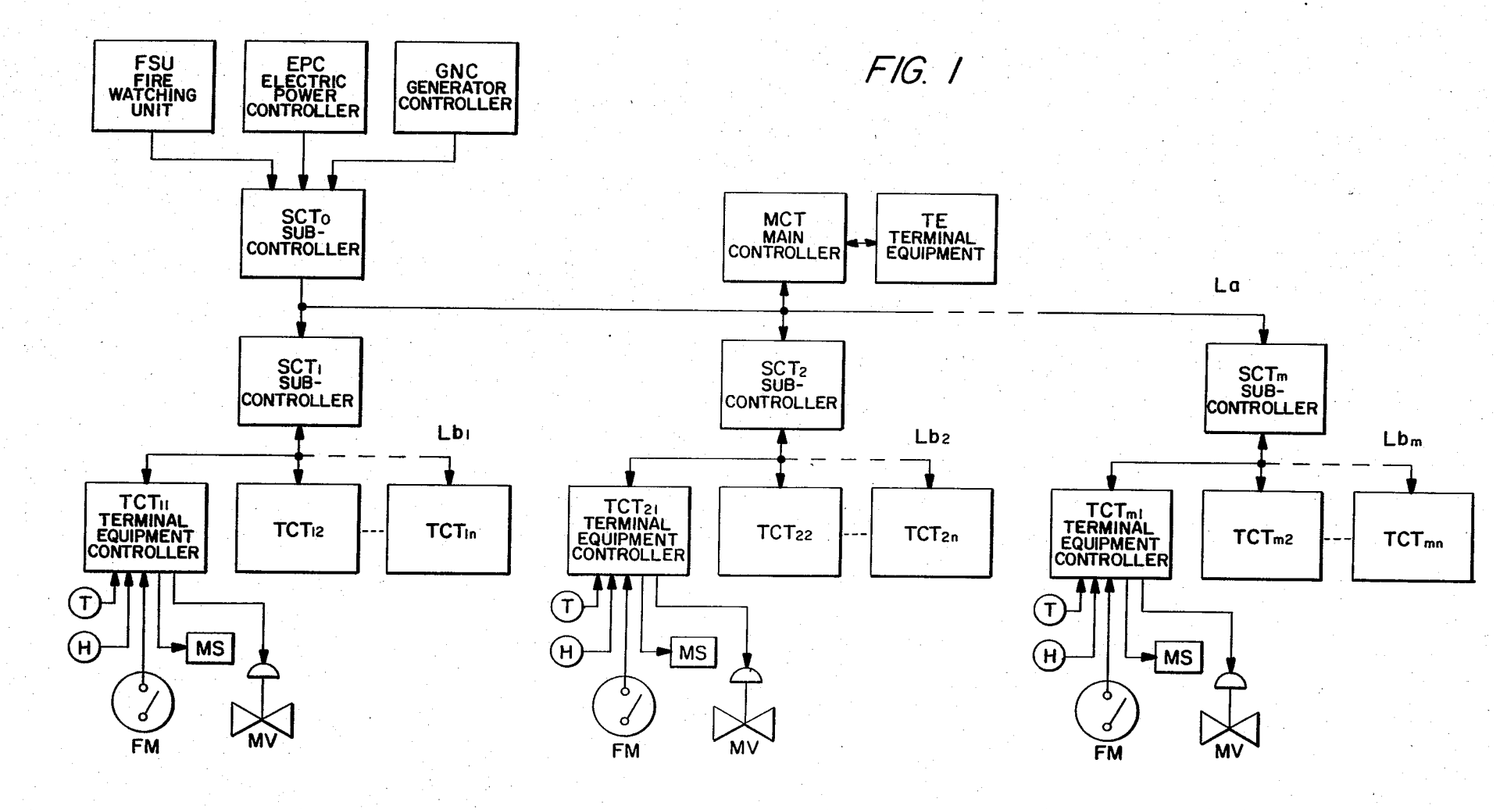
FIG. 1 is a block diagram of an overall arrangement of the present invention.

FIG. 1 is a block diagram of an overall data transmission system incorporated in an air conditioning control apparatus. A main controller MCT is connected to terminal equipment TE such as a keyboard and a cathode-ray tube display unit for allowing the operator to supply input data and receive output data through data transmission and reception between the main controller and the terminal equipment. The main controller MCT is also connected by a common transmission path La to a plurality of subcontrollers $SCT_1$ through SCTm and a monitoring subcontroller $SCT_0$ for transmitting data to and receiving data from the subcontrollers $SCT_1$ through SCTm and $SCT_0$.

The subcontrollers $SCT_1$ through SCTm are also connected respectively by transmission paths $Lb_1$ through Lbm to a plurality of terminal controllers $TCT_{11}$ through $TCT_{1n}$, a plurality of terminal controllers $TCT_{21}$ through $TCT_{2n}$, and a plurality of terminal controllers $TCT_{m1}$ through $TCT_{mn}$, respectively for relaying data transmitted and received between these terminal controllers and the main controller MCT. To each of the terminal controllers $TCT_{11}$ through $TCT_{mn}$, there are connected, for example, inputs such as local sensors including a temperature sensor T, a humidity sensor H, and a status contact of a fan motor FM, and also outputs in the form of a motor control valve MV and an electromagnetic switch MS for controlling various air conditioners. The terminal controllers $TCT_{11}$ through $TCT_{mn}$ serve to tranmit data to and receive data from the subcontrollers $SCT_1$ through $SCT_m$, and to make controlling determinations based on outputs from the sensors T and H and conditions of the status contacts of the fan motors FM for delivering controlling outputs to the motor valves MV and the electromagnetic switches MS so that the air conditioners will be individually controlled.

The monitoring subcontroller $SCT_0$ is supplied with monitored information from fire monitoring unit FSU, an electric power control unit EPC, and a generator control unit GNC other than the air conditioners, and sends the supplied information as data items.

Figure 2:
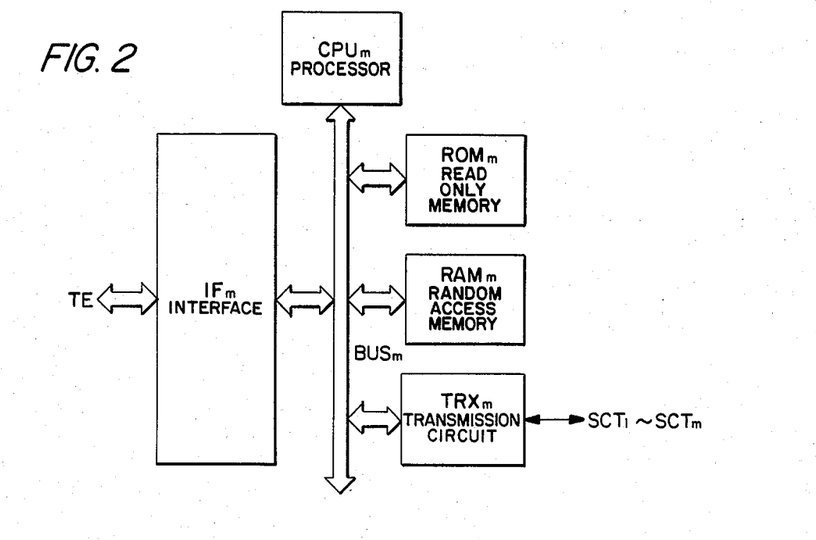
FIG. 2 is a block diagram of a main controller.

FIG. 2 is a block diagram of the main controller MCT, which comprises a processor CPUm such as a microprocessor, a read only memory ROMm, a random access memory RAMm, a transmission circuit TRXm, and an interface IFm, which are interconnected by a bus BUSm. The processor CPUm executes instructions stored in the read only memory ROMm, and stores in and reads from the random access memory RAMm such data items as received from and transmitted to the subcontrollers $SCT_{11}$ through $SCT_m$ and $SCT_0$ through the transmission circuit TRXm, and such data as received from and transmitted to the terminal equipment TE through the interface IFm.

Figure 3:
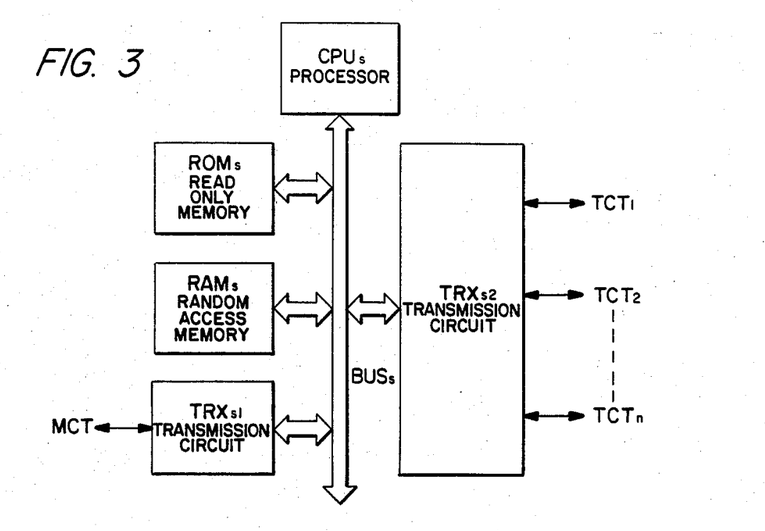
FIG. 3 is a block diagram of a subcontroller.

FIG. 3 is a block diagram of each of the subcontrollers $SCT_1$ through $SCT_m$ and $SCT_0$, which comprises, like the main controller MCT, a processor CPUs, a read only memory ROMs, a random access memory RAMs, and transmission circuits $TRXs_1$ and $TRXs_2$, which are connected together by a bus BUSs. The processor CPUs operates under instructions stored in the read only memory ROMs to store in or read from the random access memory RAMs such data items as received from and transmitted to the terminal controllers $TCT_{11}$ through $TCT_{mn}$ through the transmission circuit $TRXs_1$ and $TRXs_2$, or to transmit monitored information as it is retrieved from the random access memory RAMs.

Figure 4:
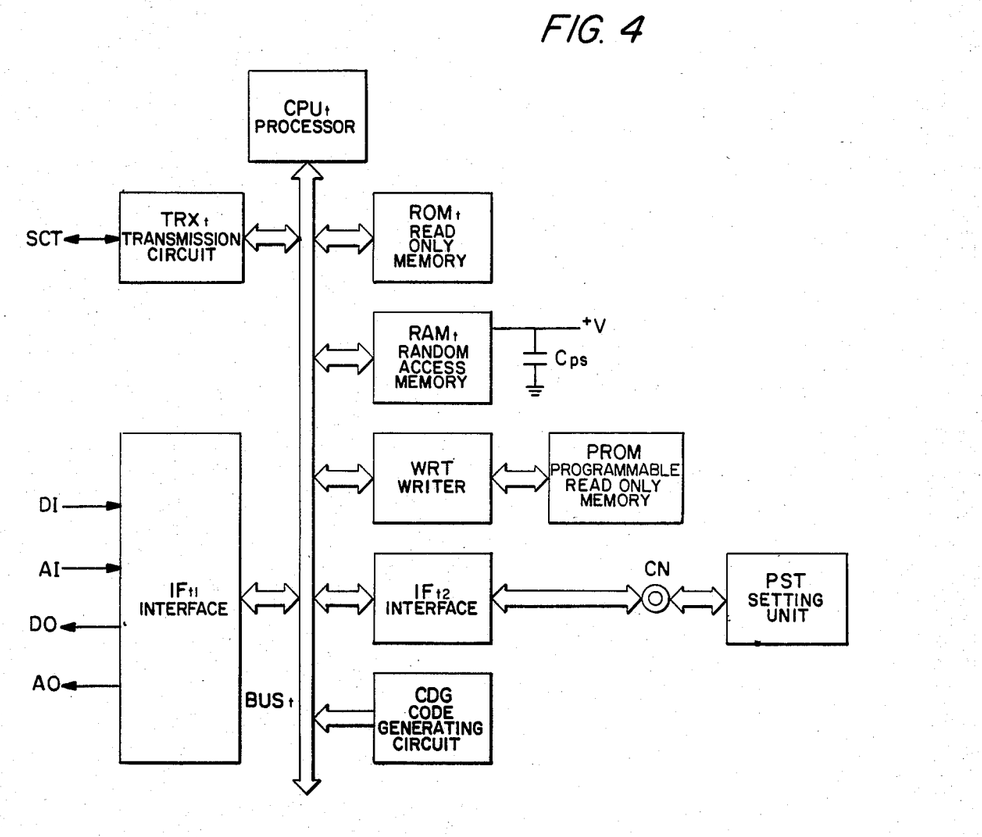
FIG. 4 is a block diagram of a terminal controller.

FIG. 4 shows each of the terminal controllers $TCT_{11}$ through $TCT_{mn}$ in block form, each terminal controller comprising, like the main controller MCT, a processor CPUt, a read only memory ROMt, a random access memory RAMt, a transmission circuit TRXt, and interfaces $IFt_1$ and $IFt_2$, which are interconnected by a bus BUSt. There is a programmable read only memory PROM connected to the bus BUSt by a write circuit WRT through which data items stored in the programmable read only memory PROM can be accessed. Once written in the programmable read only memory PROM, data items can be held permanently thereby until they are erased by ultraviolet radiation or electrical means.

The random access memory RAMt is connected to a power supply +V to which there is coupled a capacitor Cps of a large capacitance for preventing data stored in the random access memory RAMt from being erased in the event of a failure of the power supply +V.

The processor CPUt executes instructions stored in the read only memory ROMt to transmit data to or receive data from the subcontrollers $SCT_1$ through SCTm through the transmission circuit TRXt, receive digital data inputs DI from the sensors and status contact and an analog data input AI through the interface $IFt_1$, and deliver a digital data output DO and an analog data output AO through the interface $IFt_1$ to the units to be controlled. At the same time, required data items are stored in and read from the random access memory RAMt. Important data items are stored permanently in the programmable read only memory PROM through the write circuit WRT. The processor CPUt makes control decisions based on the data items DI and AI indicative of the outputs from the sensors and the condition of the status contact and the transmitted and received data items, and delivers out the data outputs DO and AO as control outputs.

The interface $IFt_2$ is connected to a connector CN to which there is coupled, if necessary, a small-size and portable setting unit PST having a keyboard and a character display. The processor CPUt is responsive to operation of the setting unit PST for displaying contents of the random access memory RAMt and the programmable read only memory PROM, and updating the data stored therein and storing new data therein.

A code generator CDG is connected to the bus BUSt for issuing a number code indicative of its own sequential place. When the terminal controller is a finally polled one, the code generator CDG adds an end code to its own number code and delivers the same to the main controller MCT to inform the latter that data transmission to and data reception from all of the terminal controllers $TCT_{11}$ through $TCT_{mn}$ have been completed.

Figure 5:
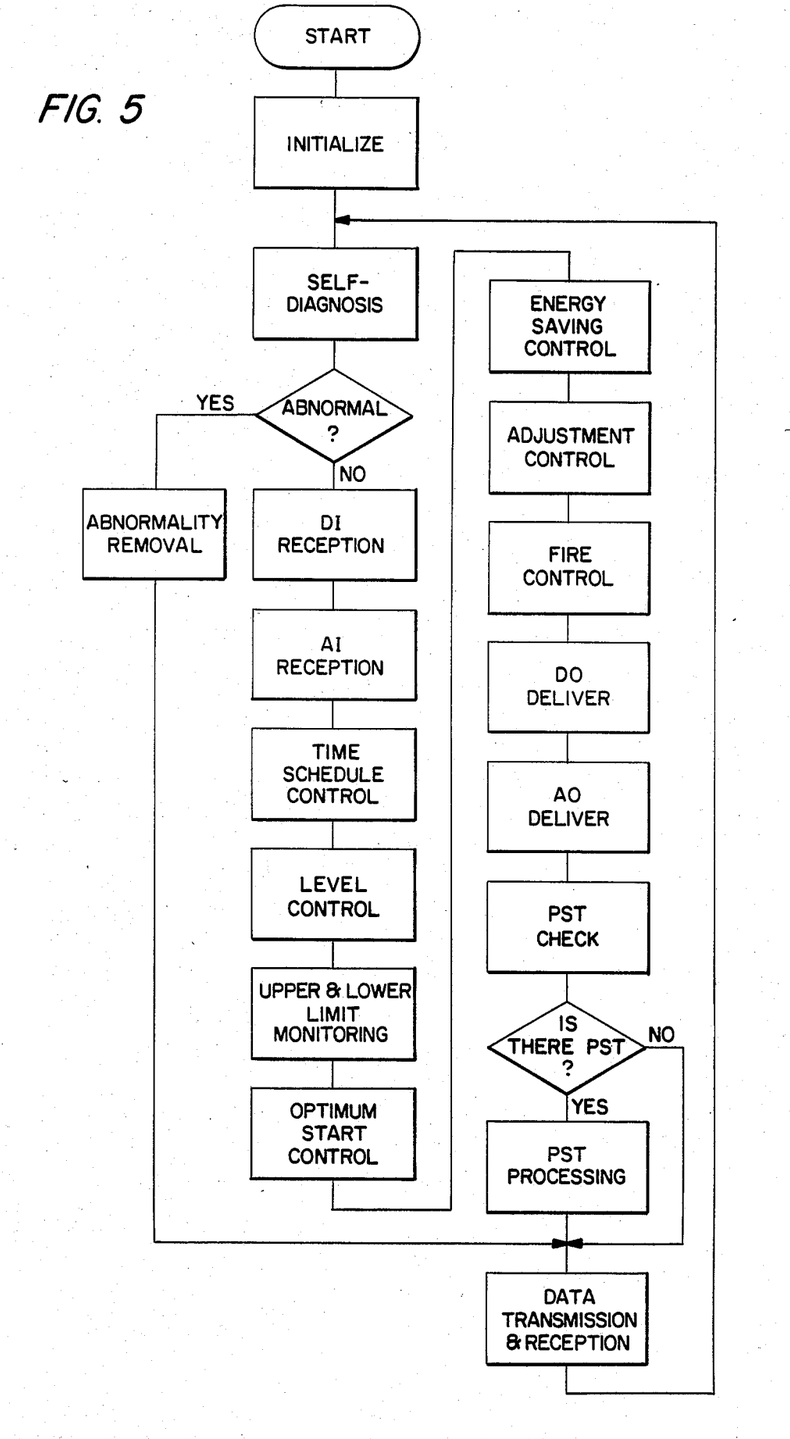
FIG. 5 is an overall flowchart showing operation of the terminal controller controlled by a processor.

FIG. 5 is an overall flowchart showing operations of the terminal controllers $TCT_{11}$ through $TCT_{mn}$ controlled by the processor CPUt. After "START" set off when the power supply is turned on or a power failure is cleared, initial settings are set up in the step of "INITIALIZE", and then a "self-diagnosis" is carried out by reading test data from the random access memory RAMt and determining whether the data access is normal or not, whether data settings are stored or not in the random access memory RAMt, and whether the number of all bits of data stored in the random access memory RAMt upon power fault clearing is the same as that prior to the power failure. If the answer to the inquire "ABNORMAL?" is yes, then the step of "ABNORMALITY REMOVAL" is effected as by transferring the content of the programmable read only memory PROM to the random access memory RAMt, and then the abnormality occurrence is transmitted through the subcontrollers $SCT_1$-$SCT_m$ to the main controller MCT at the step of "DATA TRANSMISSION AND RECEPTION". Required data is transmitted from the main controller MCT and stored in the random access memory RAMt.

If the answer to "ABNORMAL?" is negative, then the digital data input DI and the analog data input AI are received at the steps of "DI RECEPTION" and "AI RECEPTION" and stored in the random access memory RAMt. Thereafter, the successive steps of "TIME SCHEDULE CONTROL", "LEVEL CONTROL", "UPPER AND LOWER LIMIT MONITORING", "OPTIMUM START CONTROL", "ENERGY-SAVING OPERATION CONTROL", "ADJUSTMENT CONTROL" and "FIRE CONTROL" (described later on) are carried out. Thereafter, the digital data output DO and the analog data output AO are delivered out at the steps of "DO DELIVER" and "AI DELIVER", which are followed by the step of "PST CHECK" to check whether a setting unit PST is connected or not. If the answer to the question "IS THERE PST?" is no, then the program immediately goes to the step of "DATA TRANSMISSION AND RECEPTION". However, if the answer to "IS THERE PST?" is affirmative, the step of "PST PROCESSING" is performed as by issuing data to the setting unit PST and storing data from the setting unit PST. Thereafter, current data as required is transmitted in the step of "DATA TRANSMISSION AND RECEPTION", and received data is stored in the random access memory RAMt. The foregoing operations are then repeated.

In the step of "TIME SCHEDULE CONTROL", data items stored as a week program concerning times at which the air conditioner is to be started and stopped are read out of the random access memory RAMt, the times are checked for coincidence with times given by a clock in the processor CPUt, and the air conditioner is energized only during an interval between the start and stop times.

In the step of "LEVEL CONTROL", a predetermined demand level of importance is compared with a command level determined by power consumption, operation of an emergency generator upon power fault, and power restoration with respect to each of the terminal controllers $TCT_{11}$ through $TCT_{mn}$. When the demand level is lower than the command level that is given by the monitoring subcontroller $SCT_0$, the operation of the air conditioner is brought to an end.

In the step of "UPPER AND LOWER LIMIT MONITORING", predetermined upper and lower warning limits are compared with measured values such as of room temperatures. When the measured values reach the warning limits, data indicative of warning are transmitted to the main controller MCT.

In the step of "OPTIMUM START CONTROL", an air conditioner start time is determined which is prior to a start time in a particular room area. In order to bring the room temperature up to a planned temperature at the start time, prescribed calculations are carried out on the basis of a coefficient of variation of the room temperature in the particular area and a holiday compensation coefficient dependent on how many days the program has not been executed, to thereby determine the start time on which the air conditioner is to be started.

In the step of "ENERGY-SAVING OPERATION CONTROL", excessive power consumption is prevented which would otherwise be caused by simultaneous starting of the air conditioners. Furthermore, to normalize the ON and OFF intervals of the power supply within a cycle time determined by the time period in which the power supply is allowed to be turned on at the step of "TIME SCHEDULE CONTROL", the power supply is turned on, at the time of starting, upon elapse of an offset period set up for each of the terminal controllers $TCT_{11}$ through $TCT_{mn}$, and the OFF interval is increased or reduced dependent on the room temperature for reducing the power consumption needed for air conditioner operation to a minimum.

In the step of "ADJUSTMENT CONTROL", the operation of the air conditioner is detected by the status of the operation of the fan motor FM in the air conditioner, and a control mode is determined by any of season-dependent operation modes "cooling", "heating", "dehumidification", and "humidification", or any combination thereof. Thereafter, prescribed calculations are effected on an adjustment coefficient read out of the random access memory RAMt and the outputs from the sensors H and T for controlling the motor control valve Mt.

In the step of "FIRE CONTROL", when supplied with information on the occurrence of a fire from the subcontroller $SCT_0$, the smoke due to the fire is localized against egression to other areas, and the operation of the air conditioner is stopped and the air damper is closed to prevent the fire from being promoted by the draft. This condition continues until supplied with information indicative of the fire being put out.

Figure 6:
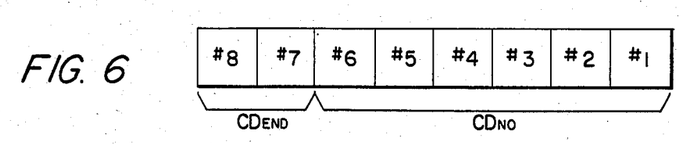
FIG. 6 is a diagram showing the arrangement of a code.

FIG. 6 is illustrative of a code added to the signals transmitted from the terminal controllers $TCT_{11}$ through $TCT_{mn}$ when they are successively controlled by polling signals from the main controller MCT to transmit data thereto and receive data therefrom through the subcontrollers $SCT_1$ through $SCT_m$, respectively. In the illustrated embodiment, the code is composed of eight bits ranging from the least significant bit #1 to the most significant bit #8. The bits #1 through #6 indicate a number code $CD_{NO}$ showing the sequential place of each of the terminal controllers $TCT_{11}$ through $TCT_{mn}$, and the bits #7 and #8 indicate an end code $CD_{END}$ showing a final sequential place or finally polled status.

Figure 7:
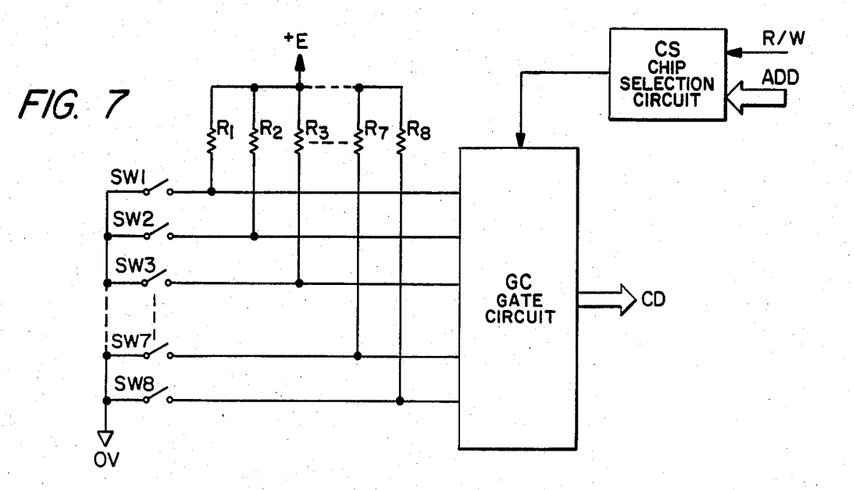
FIG. 7 is a block diagram of a code generator.

FIG. 7 illustrates in block form the code generator CDG shown in FIG. 4. The code generator CDG has a gate circuit GC supplied with a power supply voltage $+E$ through resistors $R_1$-$R_8$, and having inputs variable in level by operation of switches $SW_1$-$SW_8$ corresponding to the bits #1-#8, respectively. The bits #1-#6 indicative of the number code and the bits #7 and #8 indicative of the end code are of a logic level "1" or "0" dependent on the sequential place of each of the terminal controllers $TCT_{11}$ through $TCT_{mn}$.

The gate circuit GC issues a code CD only when a chip select circuit CS produces its output. The chip select circuit CS generates its output when the processor CPUt reads out a read/write signal R/W and addresses the gate circuit GC with an addressing signal ADD.

Figure 8:
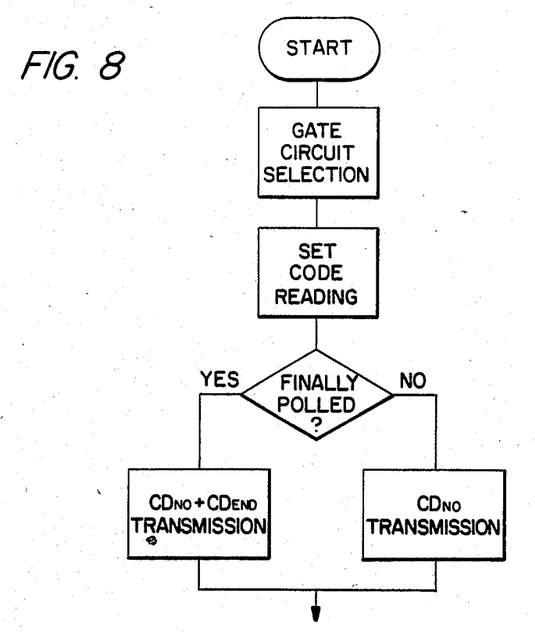
FIG. 8 is a flowchart illustrative of operations for transmitting a code.

FIG. 8 is a flowchart illustrative of operations of the processor CPUt to transmit a code. After "START", the gate circuit GC is selected in the step of "GATE CIRCUIT SELECTION", and the code CD is read in the step of "SET CODE READING". If the answer to the inquiry as to whether the terminal controller of its own is a finally polled one is negative in the step of "FINALLY POLLED?", then the number code $CD_{NO}$ is transmitted in the step of "$CD_{NO}$ TRANSMISSION" as only the number code $CD_{NO}$ has been set by the switches $SW_1$ through $SW_6$. If the answer to the inquiry "FINALLY POLLED?" is yes, then the number code $CD_{NO}$ and the end code $CD_{END}$ are transmitted in the step of "$CD_{NO}+CD_{END}$ TRANSMISSION" as the end code $CD_{END}$ has also been set by the switches $SW_7$ and $SW_8$.

The main controller MCT can thus confirm the sequential places of the terminal controllers $TCT_{11}$ through $TCT_{mn}$ with the number codes $CD_{NO}$, and can also detect the completion of transmission of data to and reception of data from all of the terminal controllers $TCT_{11}$ through $TCT_{mn}$ based on the end code $CD_{END}$. The main controller MCT can, therefore, store data items successively at addresses in the random access memory RAMm, and can enter a next operation in response to the reception of the end code $CD_{END}$.

It therefore suffices for the main controller MCT and the subcontrollers $SCT_1$ through $SCT_m$ only to provide a desired data storage area in the random access memory RAMm without the need to set up a data file.

The data items transmitted between the main controller MCT, the subcontrollers $SCT_1$-$SCT_m$, and the terminal controllers $TCT_{11}$-$TCT_{mn}$ include data on the time of installation of the terminal controllers, constant processing periods, required data, kinds of data, number codes and end codes of the terminal controllers. However, only the required data, number codes, and end codes may be transmitted on normal polling so that the data items can be transmitted at an increased speed, and a data file may be revised only when a new terminal controller is installed, at the time of constant-period processing, and as required.

The number code $CD_{NO}$ and the end code $CD_{END}$ may also be added when the terminal controllers $TCT_{11}$-$TCT_{mn}$ individually transmit data to and receive data from the main controller MCT as well as when they transmit data to and receive data from the main controller MCT in a sequence.

The present invention can include a variety of modifications as the number of bits and the type of the codes $CD_{NO}$ and $CD_{END}$ can be determined to meet particular conditions, and the arrangement of FIG. 7 can be of any selected construction. The present invention is applicable not only to control of air conditioners, but also to various data transmission systems.

With the present invention, as described above, the simple arrangement allows the main controller to dispense with a data file, and hence devices used can freely be changed. The present invention is highly advantageous when incorporated in a variety of systems in which data is transmitted between a main control unit and a plurality of local devices.

The embodiments of the invention in which an exclusive property or right is claimed are defined as follows:

1. A data transmission system for use in an air conditioning control apparatus, said system being composed of a main controller and a plurality of terminal controllers for successively transmitting data to and receiving data from said main controller in response to polling signals from said main controller, said polling signals transmitted in a polling sequence, characterized in that a finally polled one of said terminal controllers transmits an end code indicating that it is the last terminal controller in the polling sequence, said main controller detecting completion of transmission of data to and reception of data from all of the terminal controllers in response to said end code.

2. The system of claim 1 wherein each of said terminal controllers comprises a code generator capable of generating said end code.

3. The system of claim 2 wherein said code generator comprises code means for generating a number code identifying the particular terminal controller trasmitting and receiving data and capable of generating an end code identifying a particular terminal controller as the finally polled terminal controller.

4. the system of claim 3 wherein said code means comprises first switching means for selecting said number code to be generated and second switching means for selecting said end code, if desired, to be generated.

5. The system of claim 4 wherein said code generator comprises a gate circuit connected to said first and second switching means for permitting transmission of said end code, if said end code is selected, and said number code to said main controller.

6. The system of claim 5 wherein said code generator comprises a chip select circuit for energizing said gate circuit when said terminal controllers are to transmit data.

7. The system of claim 6 wherein said terminal controller comprises at least a temperature sensor for indicating temperature of a space associated with said terminal controller and an output useful for controlling temperature of that area.

8. A data transmission system for use in an air conditioning control apparatus, said system comprising:

a main controller for transmitting data, including polling messages, and for receiving data, said polling messages transmitted in a polling sequence;

a communication bus connected to said main controller for conducting said data; and, a plurality of terminal controllers connected to said communication bus for transmitting data to said main controller upon receiving a polling message and for receiving data from said main controller, a finally polled one of said terminal controllers comprising means for transmitting an end code indicating that it is the last terminal controller in the polling sequence, said main controller detecting completion of transmission of data to and reception of data from all of the terminal controllers in response to said end code.

9. The system of claim 8 wherein each of said terminal controllers comprises a code generator capable of generating said end code.

10. The system of claim 9 wherein said code generator comprises code means for generating a number code identifying the particular terminal controller transmitting and receiving data and capable of generating an end code identifying a particular terminal controller as the finally polled terminal controller.

11. The system of claim 10 wherein said means comprises first switching means for selecting said number code to be generated and second switching means for selecting said end code, if desired, to be generated.

12. The system of claim 11 wherein said code generator comprises a gate circuit connected to said first and second switching means for permitting transmission of said end code, if said end code is selected, and said number code to said main controller.

13. The system of claim 12 wherein said code generator comprises a chip select circuit for energizing said gate circuit when said terminal controllers are to transmit data.

14. The system of claim 13 wherein said terminal controller comprises at least a temperature sensor for indicating temperature of a space associated with said terminal controller and an output useful for controlling temperature of that area.

* * * * *

UNITED STATES PATENT OFFICE
CERTIFICATE OF CORRECTION

PATENT NO. : 4,574,283
DATED : March 4, 1986
INVENTOR(S) : Arakawa et al

It is certified that error appears in the above-identified patent and that said Letters Patent are hereby corrected as shown below:

Column 7, line 23, change "the" to --The--.

Column 8, line 26, after "said" insert --code--.

Signed and Sealed this

First Day of July 1986

[SEAL]

Attest:

DONALD J. QUIGG

Attesting Officer

Commissioner of Patents and Trademarks